G. E. JACKSON.
BALING PRESS.
APPLICATION FILED NOV. 5, 1909.
971,616.
Patented Oct. 4, 1910.
5 SHEETS—SHEET 4.
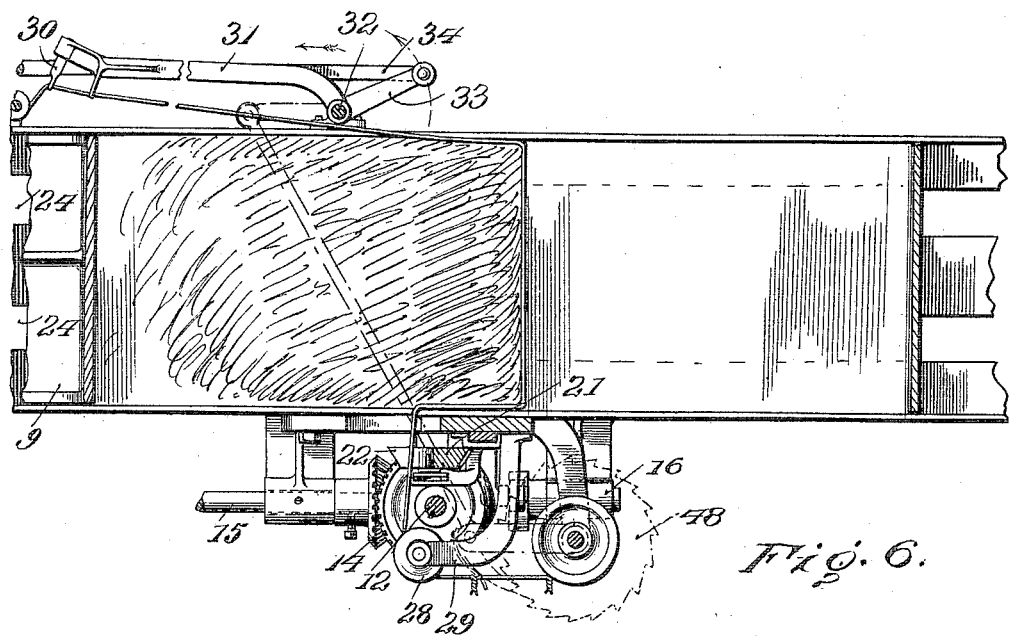
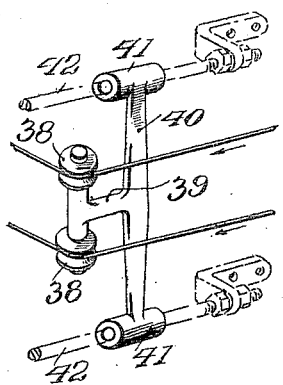
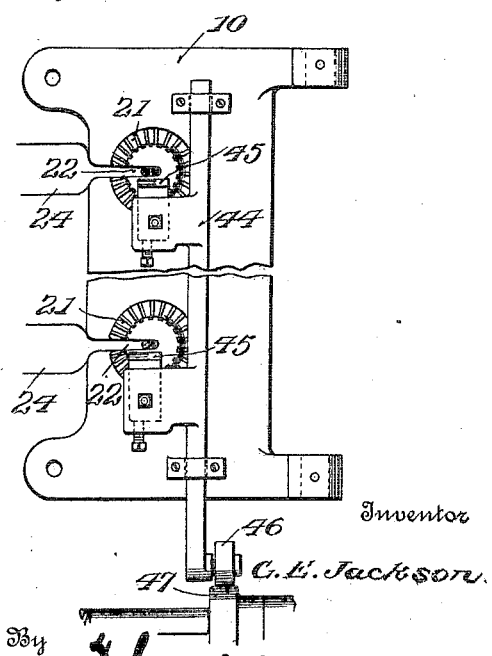
Witnesses
W. R. Woodson,
Juana M. Fallin,
Inventor
G. E. Jackson,
By
Evan Lacey, Attorneys

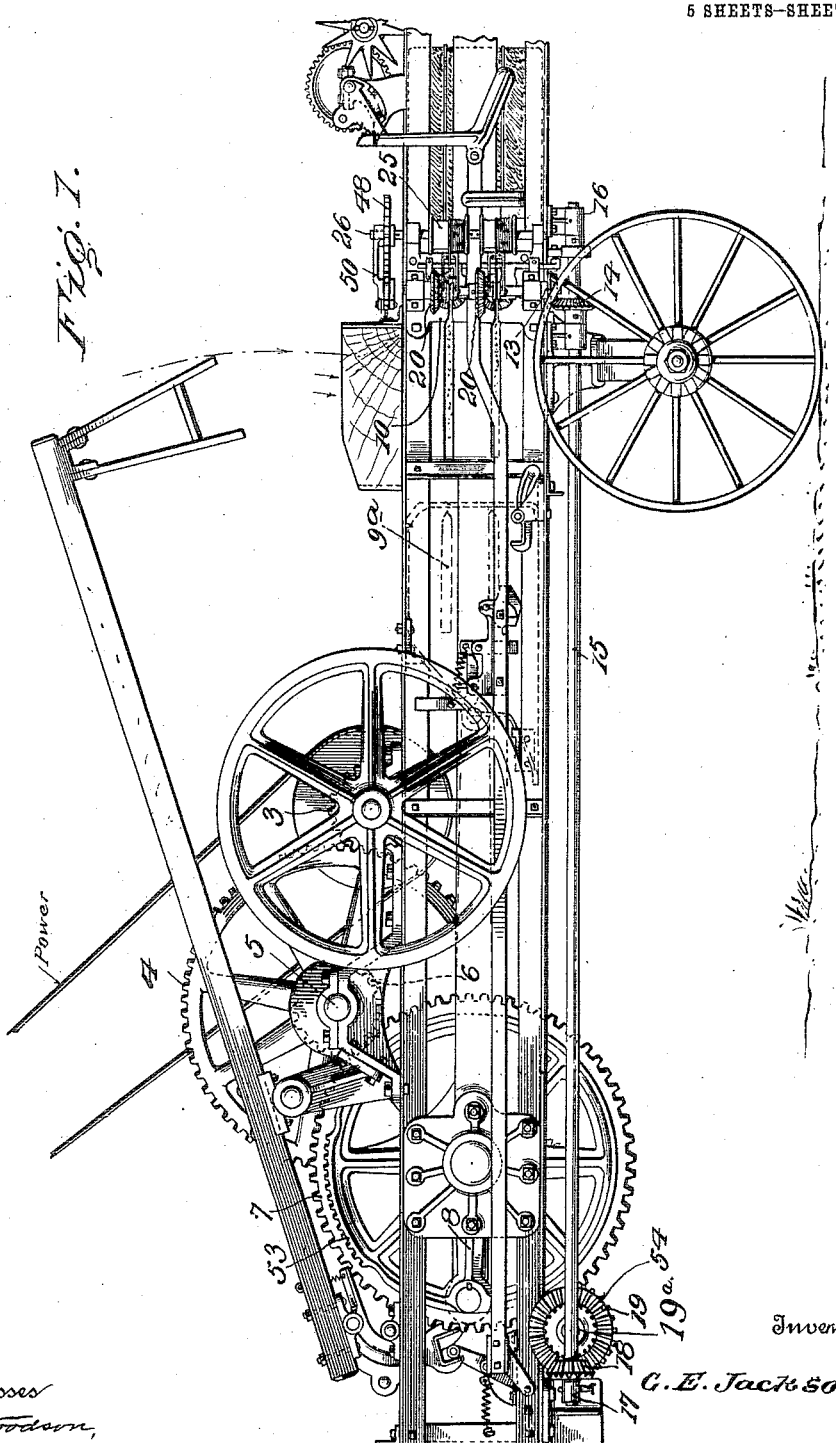

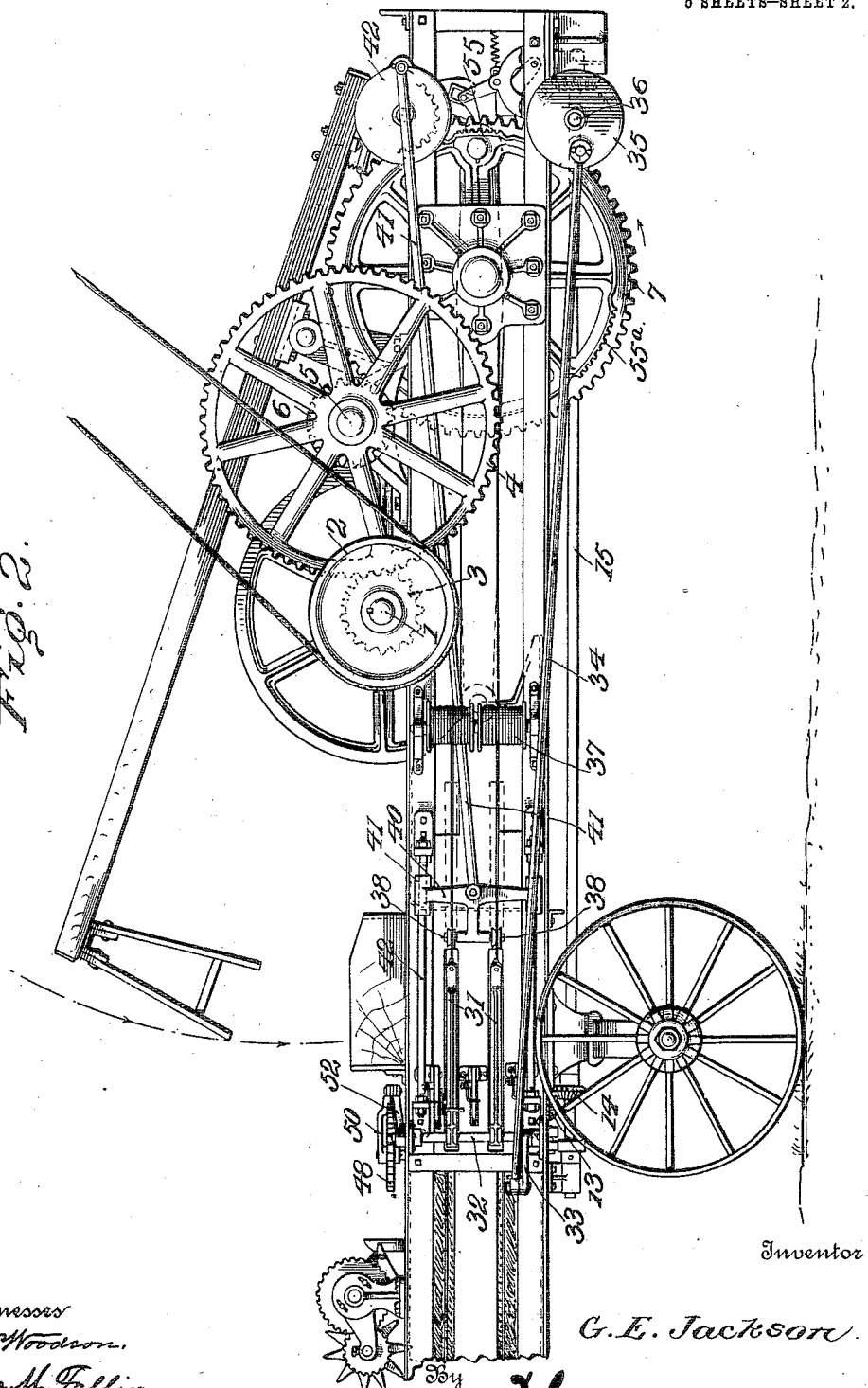

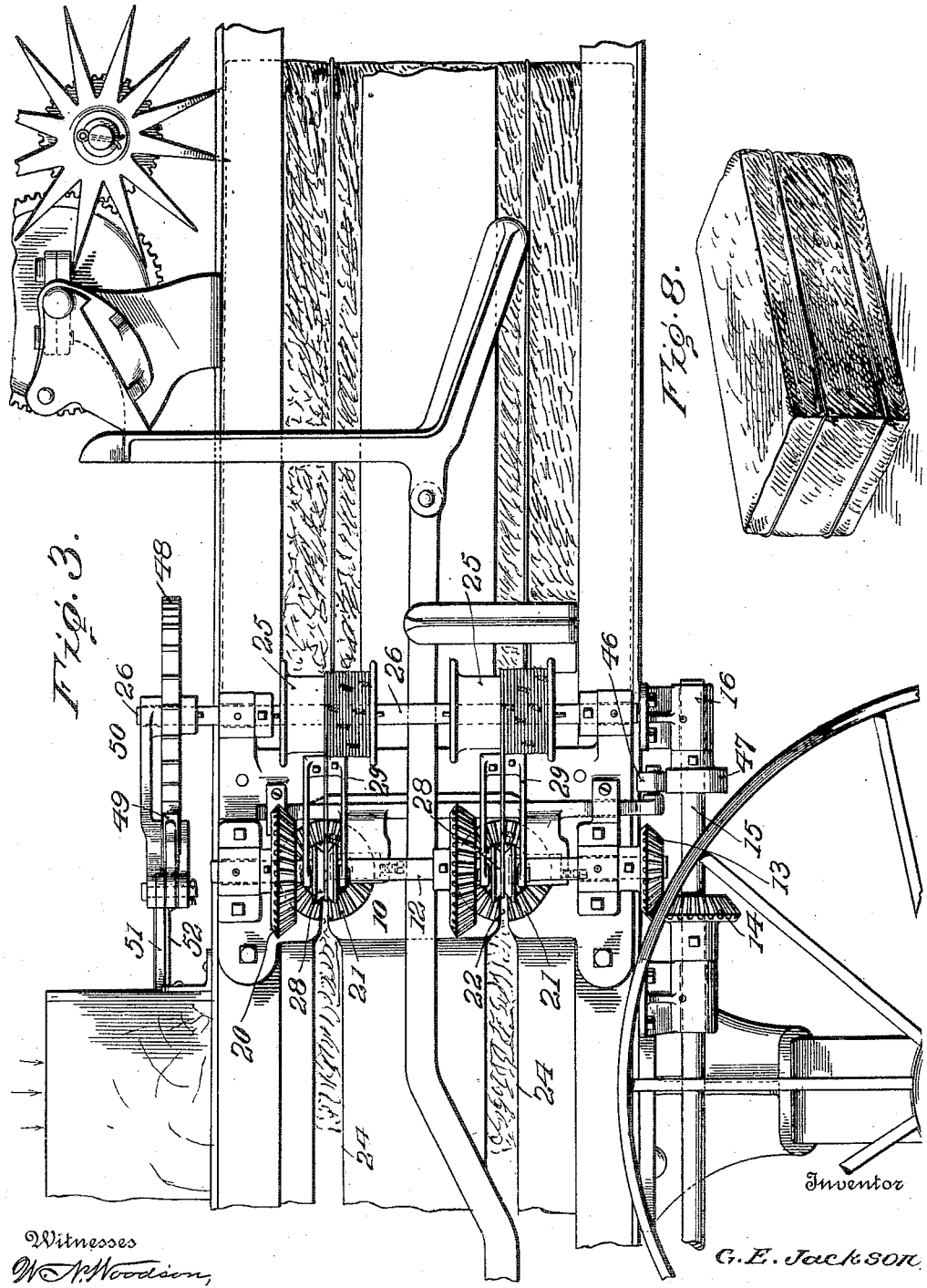

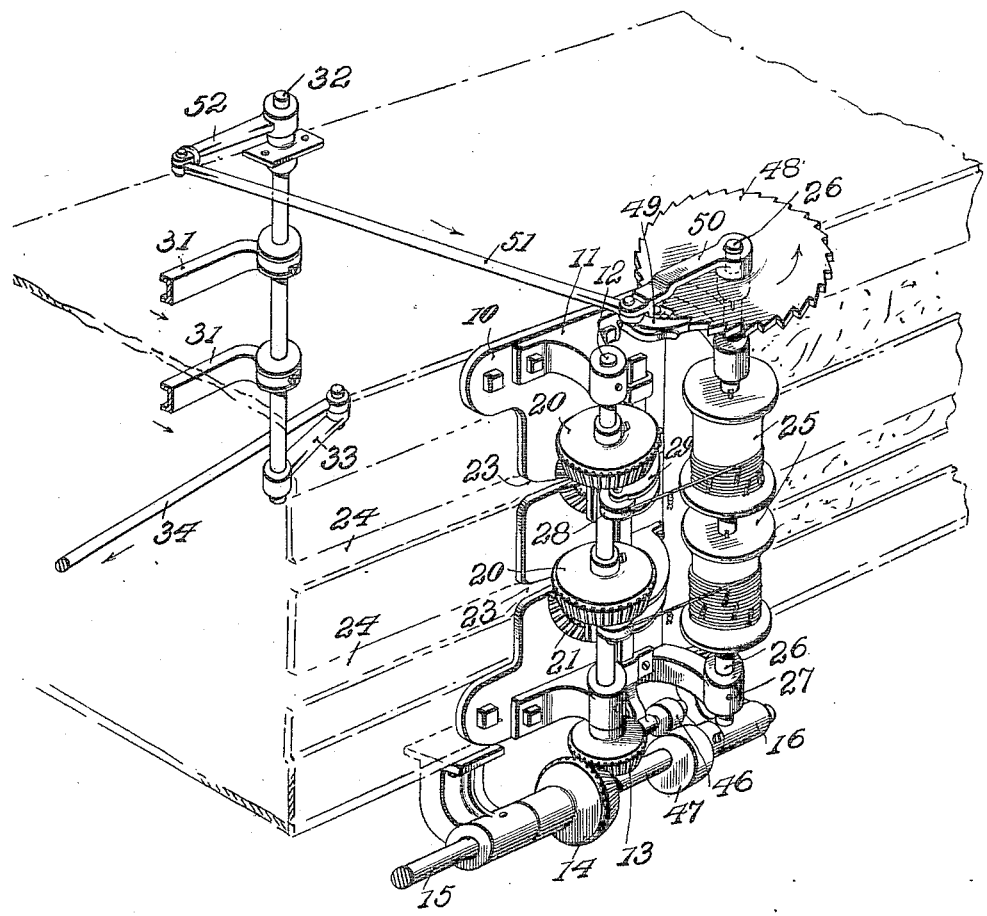

ated Oct. 4, 1910.

UNITED STATES PATENT OFFICE.

GEORGE E. JACKSON, OF NEWTON, IOWA.

BALING-PRESS.

971,616.

Specification of Letters Patent.    Patented Oct. 4, 1910.

Application filed November 5, 1909.    Serial No. 526,444.

*To all whom it may concern:*

Be it known that I, GEORGE E. JACKSON, citizen of the United States, residing at Newton, in the county of Jasper and State of Iowa, have invented certain new and useful Improvements in Baling - Presses, of which the following is a specification.

This invention comprehends certain new and useful improvements in automatic presses for baling hay or similar materials.

One of the primary objects of the invention is a baling press in which the parts are so arranged that they will be easily accessible for the purposes of adjustment or repair.

Another object of the invention is a baling press embodying an improved construction and arrangement of parts constituting wire twisting mechanism and feeding mechanism for leading the wires to the twisters, the parts being so arranged that the wire or wires will be held directly across the baling chamber, and not diagonally in relation thereto, thereby avoiding the packing down of the hay or other material on to the wires which would interfere with the formation of a perfect bale.

The invention also has for its object an improved construction of wire twisting mechanism which will operate effectively to twist the strands of wire tightly around the bale and subsequently cut the wire so as to permit a portion thereof to pass out with the bale, and also an improved construction of combined wire holder for the waste wire, the same embodying positive actuating mechanism which operates automatically and intermittently to carry off the waste wire and securely hold one end of the wire as the bale is being formed. And a further object of the invention is a baling press which will be comparatively light and yet strong and durable and which will be composed of comparatively few parts that may be easily manufactured and readily assembled and which will operate efficiently and automatically in all the necessary steps, after the wires have once been threaded through the needles and secured to the combined wire holders and waste wire drums.

With these and other objects in view as will more fully appear as the description proceeds, the invention consists in certain constructions, arrangements and combinations of the parts that I shall hereinafter fully describe and claim.

For a full understanding of the invention, reference is to be had to the following description and accompanying drawings, in which:

Figure 1 is a side elevation of a portion of a baling press embodying the improvements of my present invention; Fig. 2 is a similar view looking at the opposite side of the press; Fig. 3 is a side elevation, on an enlarged scale, of a portion of the baling part of the press, illustrating particularly the wire twisting mechanism and waste wire holders; Fig. 4 is a horizontal sectional view through the baling chamber; Fig. 5 is a detail perspective view of a portion of the wire straightening mechanism designed to pass the wires straight across the baling chamber preparatory to the formation of the bale; Fig. 6 is a detail side elevation, illustrating particularly the wire cutting mechanism; Fig. 7 is a perspective view of the wire twisting devices, waste wire drums, and actuating mechanism therefor; and Fig. 8 is a detail perspective view of a bale, illustrating particularly the points where the tie wires are twisted.

Corresponding and like parts are referred to in the following description and indicated in all the views of the drawings by the same reference characters.

The framework of my improved baling press may be of any desired construction and design and is preferably mounted upon traveling wheels so that it may be moved conveniently from place to place wherever it is desired that the baling operation shall be performed. Near the rear end of the framework a driving shaft 1 is journaled, said shaft carrying at one end a driving pulley 2, by which it may receive its motion from any suitable source of power, and carrying at its other end a spur pinion 3 which meshes with a gear wheel 4 on one end of a countershaft 5. The countershaft 5 carries at its opposite end a spur pinion 6 meshing with a gear wheel 7 which is mounted upon a stub shaft in the framework of the machine, said wheel 7 being connected to the pitman 8 which reciprocates the plunger 9.

To one side of the framework contiguous to the baling chamber thereof, a vertically disposed plate 10 is secured in any desired way. This plate 10 is provided with brackets 11 in which a vertically disposed shaft 12 is journaled. The shaft 12 is provided at one end with a bevel pinion 13 which meshes with a corresponding pinion 14 on the substantially horizontally disposed and longitudinally extending twister actuating shaft 15. This shaft is journaled at one end in a bracket 16 projecting laterally from the plate 10 and is journaled at its opposite end in a bearing 17 at the rear end of the press, receiving its motion through the instrumentality of bevel gears 18 and 19 that are mounted on said shaft and a transversely extending countershaft 19ª operated from the main spur gears 7 in any desired way. The shaft 12 before mentioned, also carries beveled drive pinions 20 which mesh with twister pinions 21, the same being journaled on the base plate 10 in any desired way, and being formed with slots 22 which terminate at their centers and which are designed to receive the twister wires, said slots being of such a width that they will receive the wires singly, but will not permit the two strands of the wires to pass one another, thereby effecting a twisting of the strands when the pinions 21 are rotated. The plate 10 is formed with slots 23 designed to guide the wires into the slots 22 of the twisters and the framework is provided with corresponding slots 24 so as to provide clearance passages for the needle carrying arms in their operation of feeding the wires to the twister pinions.

25 designates wire holders and waste wire drums combined. These are vertically disposed as best shown in Figs. 3 and 7, in juxtaposition to the twister pinions 21, and are mounted on a vertical shaft 26 journaled in brackets 27 secured to or formed on the base plate 10. It is to be understood that the wires are first fed by hand to the wire holders and waste drums 25 and secured thereto in any desired way, said wires in their passage being extended over idlers 28 which are mounted in brackets 29 formed on the plate 10, the idlers being positioned substantially in lateral or transverse alinement with the centers of the twister pinions 21, whereby they will hold the wires properly with relation to the twister pinions as the latter operate to twist the strands. The wires are also passed through needles 30 that are formed on needle carrying arms 31, said arms being mounted upon a vertical shaft 32 journaled on the side of the framework opposite to the place where the twisting devices are located. The shaft 32 is provided with a crank arm 33 at its lower end, said crank arm being connected to a pull rod 34, which extends longitudinally of the framework, as best seen in Fig. 2, to the rear end of the latter, the rear end of the pull rod 34 being eccentrically connected to a crank disk 35 mounted on a transverse shaft 36 at the rear of the framework. It will be understood that the needle carrying arms 30 pass the wires from supply spools 37 to the twisting pinions, by a laterally swinging movement, as indicated best in Fig. 4, and that the plunger 9 is formed with slots 9ª through which the needle carrying arms pass, it being the intention to actuate the needle carrying arms so as to swing them across the baling chamber with the plunger at the extreme limit of its forward movement. The mechanism for performing this exact operation and the exact formation of the needle carrying arms are fully described in my co-pending application filed June 9, 1909, Serial No. 501,085, and also in my co-pending application filed October 6, 1908, Serial No. 456,377, to both of which reference may be had.

In order that the wire may be held straight across the baling chamber and not lie diagonally across the same, in which latter event the incoming hay or the like would lie on both sides of the wire and thereby interfere with the formation of a perfect bale, I have provided in the present embodiment of my invention wire straightening mechanism. This mechanism embodies rollers 38, one for each wire. These rollers are journaled on the upwardly and downwardly extending arms of a T-head 39 which is formed on the vertically disposed and horizontally movable arm 40. This arm 40 is formed at its upper and lower ends with sleeves 41 by which it is mounted to slide upon horizontally disposed rods 42 secured to one side of the framework at the baling chamber by brackets of any desired kind. The arm 40 is pivotally connected to the forward end of a pitman or actuating rod 41, the rear end of said rod being eccentrically connected to a crank disk 42 journaled on one side of the framework preferably above the disk 35 before mentioned, and it will thus be understood that at the proper time, which will be presently described in connection with the description of the operation of all the other parts which relate to the present invention, the crank disk 42 will be operated to move the arm 40 forwardly so as to carry the wires from the spools 37 toward the shaft 12 of the twisting mechanism.

In order to cut the wires after the strands have been twisted, I have provided a vertically disposed knife bar 44 which is mounted for a vertically reciprocating movement on the base plate 10 and which carries blades 45 that are adapted to be projected across the slots of the twister pinions so as to sever the wires. The knife bar 44 is provided at its lower end with a roller 46 designed to be engaged by a cam 47 which projects from the shaft 15, as best illustrated in Figs. 3, 6 and 7.

In order to intermittently actuate the combined wire holders and waste wire drums 25 and in order to take up the slack of the waste wire to hold the same firmly preparatory to the formation of the next bale, I have provided in the present instance a ratchet wheel 48 which is keyed or otherwise secured to the upper end of the shaft 26 (see Fig. 7). To operate the ratchet 48 a pawl 49 is provided, said pawl being spring pressed into engagement with the ratchet teeth and being carried by an arm 50 which is supported loosely on the upper end of the shaft 26. The arm 50 is connected by a link rod 51 to a crank 52 secured on the upper end of the needle arm supporting shaft 32. Hence it will be understood that as the shaft 32 is rotated by the pull rod 34 and crank 33, the arm 50 will be oscillated and a partial rotary movement imparted to the ratchet wheel 48 and shaft 26 to which it is secured.

In describing the operation of the machine which forms the subject matter of my present invention, it will be understood in the first place that there are three toothed segments journaled at the rear end of the framework. One of these segments, designated 53, and best seen in Fig. 1, intermittently meshes with a spur pinion 54 designed to effect the rotation of the bevel pinion 19 and the corresponding revolution of the shaft 15, whereby to operate the twisting mechanism and the cutting mechanism, while the other two toothed segments, mounted at the opposite side of the machine and designated 55 and 55ª, respectively, are primarily designed to successively engage, at intervals, teeth formed on the crank disk 35, whereby to operate the feeding mechanism, that is, swing the needle carrying arms across the baling chamber and back again and to also operate the combined wire holders and waste wire drums and the wire straightening mechanism. It is also to be understood that the segment 53 comes into action between the action of the segments 55 and 55ª on the disks 35 and 42.

The entire press is set in operation by an automatic clutch mechanism which is operated when a bale reaches a predetermined size, and I prefer for the automatic operation of such clutch mechanism an automatic measuring mechanism such as described and claimed in my co-pending application filed October 6, 1908, Serial No. 456,377. As this automatic mechanism is claimed in said co-pending application, I do not deem it necessary to describe it here, particularly as other elements of clutch actuating mechanism may be employed if desired so far as the present invention is concerned. Suffice it to say that when the requisite amount of hay has been fed into the baling chamber and packed by the plunger 9, this clutch mechanism will be set in operation when the plunger is at the forward limit of its movement. The first action of the machine from this point on, is to give the crank disk 35 a one-half turn from the position in which it is shown in Fig. 2, thereby pulling rearwardly upon the rod 34 and swinging the needle carrying arms 31 across the baling chamber back of the bale, the arms passing through or into the slots 9ª of the ram or plunger 9. This movement is effected by engagement of the segment 54 with the teeth of the crank disk 35. While the needles are in this position, the continued rotation of the parts will bring the toothed segment 53 into mesh with spur pinion 54 and will effect a rotation of the shaft 15 so as to rotate the twister pinions 21 to twist the strands together and finally cut the strands through the instrumentality of the cam 47 after the strands have been properly twisted, and after the toothed segment 53 has thus operated, the third toothed segment 55 will come into play and mesh with the disk 35 so as to swing the needle carrying arms back again so that they will lie longitudinally of the framework at one side of the press chamber.

It will, of course, be noted that in the first movement of the needle carrying arms just above described, the shaft 32 will impart a movement to the ratchet 48 and the latter in turn will impart a partial rotation to the drums 35 so as to take up the waste wire of the bale which has been previously formed, and wind it upon the drums and then hold one end of each wire ready for the formation of the next bale.

It yet remains to describe the wire straightening mechanism or rather the operation thereof. This mechanism is actuated by the segments 55 and 55ª. After the segment 55 has operated to move the needle carrying arms back to their normal inoperative or out of the way position, it will pass on from the eccentric or crank disk 35 to the crank disk 42 and turn the same in a direction to move the arm 40 forwardly so that the rollers 38 will carry the strands of wire passing through the needle eyes, up to the waste wire drums or wire holders back to the needle arm shaft, thus leaving the wires straight across the ends of the baling chamber flush with the end of the bale that was just tied. The purpose of this is to leave the wires out of the path of the first feed of hay after each tying operation so that the feed will not fall on top of the wires and prevent the wires from coming square around the rear end of the bale. The arm 40 is then returned by the subsequent engagement of the segment 55 with the crank disk 42.

Having thus described the invention, what is claimed as new is:

1. In a baling press, a supporting framework embodying a baling chamber, twister mechanism supported on the framework, a needle carrying arm arranged to feed a needle to the twisting mechanism, and means co-acting with said needle carrying arm for holding the wire straight across the baling chamber preparatory to the formation of a bale.

2. In a baling press, a supporting framework embodying a baling chamber, a needle carrying arm pivotally mounted on one side of the framework and arranged to swing the horizontal plane across the baling chamber, a reciprocating wire straightening device co-acting with the needle carrying arm and arranged to hold a wire straight across the baling chamber, and means for swinging the needle carrying arm and for reciprocating the wire straightening device.

3. In a baling press, a supporting framework embodying a baling chamber, a needle carrying arm arranged to swing across the said chamber, a wire holding spool mounted on the framework, a wire holder also supported on the framework, a reciprocating wire straightening device interposed between the spool and the needle carrying arm, means for swinging said arm, and means for reciprocating the wire straightening device.

4. In a baling press, embodying a baling chamber and a needle carrying arm, a wire straightening device comprising an arm, a roller carried thereby, guide rods on which said arm is mounted to reciprocate, and means for reciprocating said arm.

5. In a baling press, a supporting framework embodying a baling chamber, a twister pinion mounted at one side of the framework at the baling chamber, a shaft journaled on the other side of the framework opposite the twister pinion, a needle carrying arm mounted on said shaft and arranged to swing across the baling chamber toward and from the twister pinion, means for turning said shaft, means for turning the twister pinion, a waste wire drum mounted on the same side of the framework as the twister pinion, and a driving connection from the shaft of the needle carrying arm to the waste wire drum arranged to effect an intermittent movement of the latter upon the turning of the former.

6. In a baling press, a supporting framework embodying a baling chamber, a twister pinion mounted on one side of the framework at the baling chamber, a waste wire drum mounted on the same side of the framework, a shaft to which the drum is secured, a ratchet secured to said shaft, a pawl meshing with said ratchet, a shaft journaled on the opposite side of the framework and provided with a crank, a link connecting said crank to the pawl, a needle carrying arm secured to said last named shaft and arranged to swing across the baling chamber to the twister pinion, and means for turning said last named shaft.

7. In a baling press, a framework embodying a baling chamber, a twister pinion mounted on one side of the framework at the baling chamber, a waste wire drum mounted on the same side of the framework as the twister pinion, the twister pinion being formed with a slot, an idler roller supported out from the framework in transverse alinement with the inner end of the slot of the twister pinion and over which the wire is adapted to pass from the pinion to the waste wire drum, means for feeding wire into the slot of the twister pinion from whence the wire extends over the idler to the drum, and means for imparting an intermittent movement to the drum.

8. In a baling press, a supporting framework embodying a baling chamber, a vertically disposed shaft journaled on one side of the framework at the baling chamber, a horizontally swinging needle carrying arm secured to said shaft and arranged to swing laterally across the baling chamber, said shaft being provided at its upper end with a crank and at its lower end with another crank, a pull rod connected to the said last named crank, means for moving said rod, a twister pinion mounted at the opposite side of the framework and adapted to receive the wire from the needle carrying arm, a waste wire drum journaled on the same side of the framework as the twister pinion, means for turning said twister pinion, a shaft upon which the waste wire frame is mounted, a ratchet secured to said shaft, an arm supported loosely upon said shaft, a pawl carried by said arm, and a link rod connecting the upper crank to said arm.

9. In a baling press, a supporting framework embodying a baling chamber, a twister pinion mounted on one side of the framework at the baling chamber, a knife bar mounted to reciprocate on the same side of the framework as the twister pinion and provided with a knife adapted to sweep across the twister pinion to sever the twisted wires, means for turning said twister pinion, said means embodying an actuating shaft, said shaft provided with a cam arranged to intermittently engage the knife bar, and means for turning said shaft.

10. In a baling press, a supporting framework embodying a baling chamber, twister mechanism supported thereon, means for actuating the twister mechanism, wire feeding mechanism arranged to feed wires to the twisting mechanism, means for actuating said wire feeding mechanism, said last named means including a pawl rod and a crank disk to which one end of said rod is connected, a wire straightening mechanism arranged to co-act with the wire feeding mechanism to hold the wire straight across the baling chamber and embodying a reciprocating arm, and means for actuating said wire straightening mechanism, such last named means including a pitman connected at one end to said arm, and a crank disk connected to the other end of the pitman, and means for turning said crank disks in section.

11. In a baling press, a supporting framework embodying a baling chamber, twister mechanism supported thereon, means for actuating the twister mechanism, wire feeding mechanism arranged to feed wires to the twisting mechanism, means for actuating said wire feeding mechanism, said last named means including a pawl rod and a crank disk to which one end of said rod is connected, a wire straightening mechanism arranged to co-act with the wire feeding mechanism to hold the wire straight across the baling chamber and embodying a reciprocating arm, and means for actuating said wire straightening mechanism, such last named means including a pitman connected at one end to said arm, and a crank disk connected to the other end of the pitman, and means for turning said crank disk in section, said means embodying two separated toothed segments adapted to mesh with the respective crank disks as and for the purpose set forth.

12. In a baling press, the combination of wire twisting mechanism, a swinging needle carrying arm arranged to feed wire to the wire twisting mechanism, means for automatically moving said arm from its initial position to the wire twisting mechanism, means for automatically actuating the twisting mechanism directly subsequent to the movement of the needle carrying arm to the twisting mechanism, automatic means for then directly returning the needle carrying arm to its initial position, and means for automatically carrying the wire straight across the baling chamber upon the completion of the movement of the needle carrying arm to its initial position.

In testimony whereof I affix my signature in presence of two witnesses.

GEORGE E. JACKSON. [L. S.]

Witnesses:
E. C. OGG,
GUST E. JOHNSON.